(12) United States Patent
Arrasvuori et al.

(10) Patent No.: US 8,644,842 B2
(45) Date of Patent: Feb. 4, 2014

(54) PERSONAL AUGMENTED REALITY ADVERTISING

(75) Inventors: Juha Arrasvuori, Tampere (FI); Jukka Antero Holm, Tampere (FI); Antti Johannes Eronen, Tampere (FI)

(73) Assignee: Nokia Corporation, Espoo (FI)

( * ) Notice: Subject to any disclaimer, the term of this patent is extended or adjusted under 35 U.S.C. 154(b) by 1223 days.

(21) Appl. No.: 11/899,023

(22) Filed: Sep. 4, 2007

(65) Prior Publication Data

US 2009/0061901 A1 Mar. 5, 2009

(51) Int. Cl.
*H04W 24/00* (2009.01)

(52) U.S. Cl.
USPC ............. 455/456.1; 455/41.2; 455/404.2; 455/414.1; 455/414.2; 455/456.3; 455/457; 455/459; 455/458; 455/566

(58) Field of Classification Search
USPC ............ 455/41.2, 404.2, 414.1, 414.2, 456.1, 455/456.3, 457, 459, 458, 566
See application file for complete search history.

(56) References Cited

U.S. PATENT DOCUMENTS

| | | | |
|---|---|---|---|
| 6,714,860 B1 | 3/2004 | Wawra et al. | |
| 2003/0027553 A1 | 2/2003 | Davidson et al. | |
| 2004/0014457 A1* | 1/2004 | Stevens | 455/414.1 |
| 2004/0048605 A1* | 3/2004 | Schaefer et al. | 455/414.2 |
| 2004/0221244 A1 | 11/2004 | Baldino | |
| 2005/0181803 A1* | 8/2005 | Weaver et al. | 455/456.1 |
| 2006/0002607 A1 | 1/2006 | Boncyk et al. | |
| 2007/0024527 A1 | 2/2007 | Heikkinen | |
| 2008/0051033 A1* | 2/2008 | Hymes | 455/47 |

FOREIGN PATENT DOCUMENTS

| | | |
|---|---|---|
| EP | 0867690 | 9/1998 |
| JP | 2003283664 | 10/2003 |
| WO | WO 00/49530 | 8/2000 |

OTHER PUBLICATIONS

U.S. Appl. No. 11/328,298, filed Jan. 9, 2006, Hamynen et al.
U.S. Appl. No. 11/523,162, filed Sep. 19, 2006, Arrasvuori.
Nikias et al., "Total Immersion", OE Magazine, Jul. 2001.
BenAbdelkader et al., "Person Identification using Automatic Height and Stride Estimation", http://research.microsoft.com/~rcutler/Gait/icpr2002.pdf, May 3, 2002.
Zhu et al., "Personalized In-store E-Commerce with the PromoPad: an Augmented Reality Shopping Assistant", The Electronic Journal for E-Commerce Tools & Applications, Feb. 2004.
Wiegand, "Calibration-free Augmented Reality", Jan. 21, 2005.

* cited by examiner

*Primary Examiner* — Kwasi Karikari
(74) *Attorney, Agent, or Firm* — Ditthavong Mori & Steiner, P.C.

(57) ABSTRACT

Personal augmented reality advertising involves detecting a proximity between a participant's mobile device and a viewer's mobile device. An identifier of the participant's mobile device and biometric data that describes the participant have both been made publicly available. The biometric data is obtained in response to detecting the proximity between the participant's mobile device and the viewer's mobile device. A match is detected between the biometric data of the participant and an image captured from a sensor of the viewer's mobile device. In response to detecting the match, the captured image and an advertisement presented with the captured image is presented in the viewer's mobile device. The advertisement is associated with the participant.

20 Claims, 7 Drawing Sheets

PERSONAL AUGMENTED REALITY ADVERTISING

FIELD OF THE INVENTION

This invention relates in general to accessing advertising services on mobile computing devices.

BACKGROUND OF THE INVENTION

The ubiquity of cellular phones and similar mobile electronics has led to demands for ever more advanced features in these devices. One feature that is of particular value in such devices is the ability to connect to the Internet and other networks. In near future, many aspects of the global networks such as the World Wide Web will be shifting to cater to mobile device users. The ability of mobile devices to receive data from wherever the user is located will provide additional opportunities to adapt content and increase the value of such content to the end user.

The always-on and always-connected nature of mobile devices makes them particularly useful in the context of commercial transactions. For example, some vending machines are configured so that a mobile phone user can purchase from the vending machine via the mobile phone. Tracking and billings of such transactions can be handled by the mobile phone service provider and third parties. These types of arrangements are useful to both merchants and consumers, because they provide alternate avenues of payment and thereby facilitate additional sales.

In addition to the properties described above, mobile phones are increasingly becoming multimedia devices. For example, it is becoming much more common for mobile phones to include an integrated camera. People are getting used to the fact they are carrying a camera with them, and can always snap a photo whenever they desire. Such devices may be able to capture video and sound and store it in a digitized format.

The ability of mobile devices to interact with the physical world of the user, as well as to interact remotely via networks, means that many new previously unimagined applications will emerge that combine these capabilities. In particular, commercial activities that effectively utilize the ability of a mobile device to determine facts about its current environment may be useful to advertisers and other promoters.

SUMMARY OF THE INVENTION

To overcome limitations in the prior art described above, and to overcome other limitations that will become apparent upon reading and understanding the present specification, the present invention discloses a system, apparatus and method for personal augmented reality advertising. In accordance with one embodiment of the invention, a method involves detecting a proximity between a participant's mobile device and a viewer's mobile device. An identifier of the participant's mobile device and biometric data that describes the participant have been made publicly available. The method further involves obtaining the biometric data in response to detecting the proximity between the participant's mobile device and the viewer's mobile device and detecting a match between the biometric data of the participant and an image captured from a sensor of the viewer's mobile device. In response to detecting the match, the method involves presenting in the viewer's mobile device the captured image and an advertisement presented with the captured image, wherein the advertisement is associated with the participant.

In more particular embodiments, the method may further involve registering the participant with a promotional service using at least one image of the participant and the identifier of the participant's mobile device, determining the biometric data from the at least one image via the promotional service, and sending the biometric data from the promotional service to the viewer's mobile device in response to detecting the proximity. In another more particular embodiment, the method may further involve registering the participant with a promotional service using the biometric data and the identifier of the participant's mobile device. In such a case, the method may also involve signaling to the promotional service an indication that the advertisement was presented in the viewer's mobile device, and valuable consideration may be provided to the participant in response to the signaling to the promotional service.

In other more particular embodiments, presenting the advertisement in the viewer's mobile device overlaid on the captured image involves displaying an advertising graphic proximate to a portion of the captured image where the participant is detected. In such a case, displaying the advertising graphic may involve overlaying a semitransparent layer over the portion of the image where the participant is detected. In other more particular embodiments, the method may also involve providing a user selectable link in the captured image in conjunction with presenting the advertisement overlaid on the captured image. In such a case, the method may also involve facilitating the download of content from the participant's mobile device to the user's mobile device in response to selecting the link.

In another embodiment of the invention, a mobile device includes a multimedia sensor, a multimedia renderer, and a processor coupled to the multimedia sensor and multimedia renderer. Memory is coupled to the processor and has instructions that cause the processor to detect a proximity between the mobile device and a participant's mobile device. An identifier of the participant's mobile device and biometric data that describes the participant has been made publicly available. In response to detecting the proximity, acquiring the biometric data, the instructions cause the processor to capture an image via the multimedia sensor and detect a match between the biometric data of the participant and the captured image. In response to detecting the match, the instructions cause the processor to present via the multimedia renderer the captured image and an advertisement presented with the captured image, such that the advertisement is associated with the participant.

In a more particular embodiment, the mobile device includes a network interface, and the instructions cause the processor to acquire the biometric data via the network interface. In such a case, the instructions may cause the processor to detect the proximity via proximity data received via the network interface. Further in such case, at least one of the biometric data and proximity data may be received from a promotional network service, where the participant has registered with the promotional service.

In another more particular embodiment, the mobile device further includes a proximity sensor, and the proximity between the mobile device and a participant's mobile device is detected via the proximity sensor. In one configuration, the multimedia render includes a display, and the instructions cause the processor to present the captured image and the advertisement by displaying an advertising graphic proximate to a portion of the captured image where the participant is detected. In such a configuration, the instructions may also cause the processor to overlay a semitransparent layer over the portion of the image where the participant is detected.

In another embodiment of the invention, a computer-readable storage medium has instructions executable by a processor of a mobile device. The instructions are capable of performing steps that include detecting a proximity between the mobile device and a participant's mobile device. An identifier of the participant's mobile device and biometric data that describes the participant have been made publicly available. In response to detecting the proximity, the instructions are further capable of causing the processor to acquire the biometric data and use the biometric data to detect a match between the biometric data of the participant and an image captured from the multimedia sensor of the mobile device. In response to detecting the match, the instructions cause the processor to present in the multimedia renderer the captured image and an advertisement overlaid on the captured image, where the advertisement is associated with the participant.

In another embodiment of the invention, an apparatus includes a network interface capable of connecting to a network and a processor coupled to the network interface. Memory is coupled to the processor and has instructions that cause the processor to register, via the network, a participant with a promotional service using at least one image of the participant and a device identifier of a mobile device of the participant. The instructions cause the processor to create biometric data with the at least one image of the participant and associate an electronically renderable advertisement with the biometric data. In response to a viewer's mobile device detecting a proximity between the participant's mobile device and the viewer's mobile device, instructions cause the processor to send the biometric data and renderable advertisement to the viewer's device via the network. The viewer's device detects the participant based on a match between the biometric data and an image captured from a sensor of the user's mobile device and, in response to detecting the match, presents in the viewer's mobile device the captured image and the advertisement associated with the biometric data.

In a more particular embodiment of the apparatus, the instructions further cause the processor to receive a signal from the viewer's device that indicates the advertisement was presented in the viewer's mobile device. In yet another more particular embodiment, the instructions further cause the processor to provide valuable consideration to the participant in response to the signaling to the promotional service.

In another embodiment of the invention, a computer-readable storage medium has instructions executable by a processor of a server for performing steps that include: a) registering, via a network, a participant with a promotional service using at least one image of the participant and a device identifier of a mobile device of the participant; b) creating biometric data with the at least one image of the participant; c) associating an electronically renderable advertisement with the biometric data; and d) in response to a viewer's mobile device detecting a proximity between the participant's mobile device and the viewer's mobile device, sending the biometric data and renderable advertisement to the viewer's device via the network. The viewer's device detects the participant based on a match between the biometric data and an image captured from a sensor of the user's mobile device and, in response to detecting the match, presents in the viewer's mobile device the captured image and the advertisement associated with the biometric data.

In another embodiment of the invention, a system includes a participant's mobile device and means for making biometric data that describes the participant and the participant's mobile device publicly available. The system also includes a viewer's mobile device having: means for detecting a proximity between the participant's mobile device and a viewer's mobile device; means for acquiring the biometric data in response to detecting the proximity; means for capturing an image; means for detecting a match between the biometric data of the participant and the captured image; and means for presenting the captured image and an advertisement presented with the captured image in response to detecting the match, wherein the advertisement is associated with the participant.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

Figure 1:
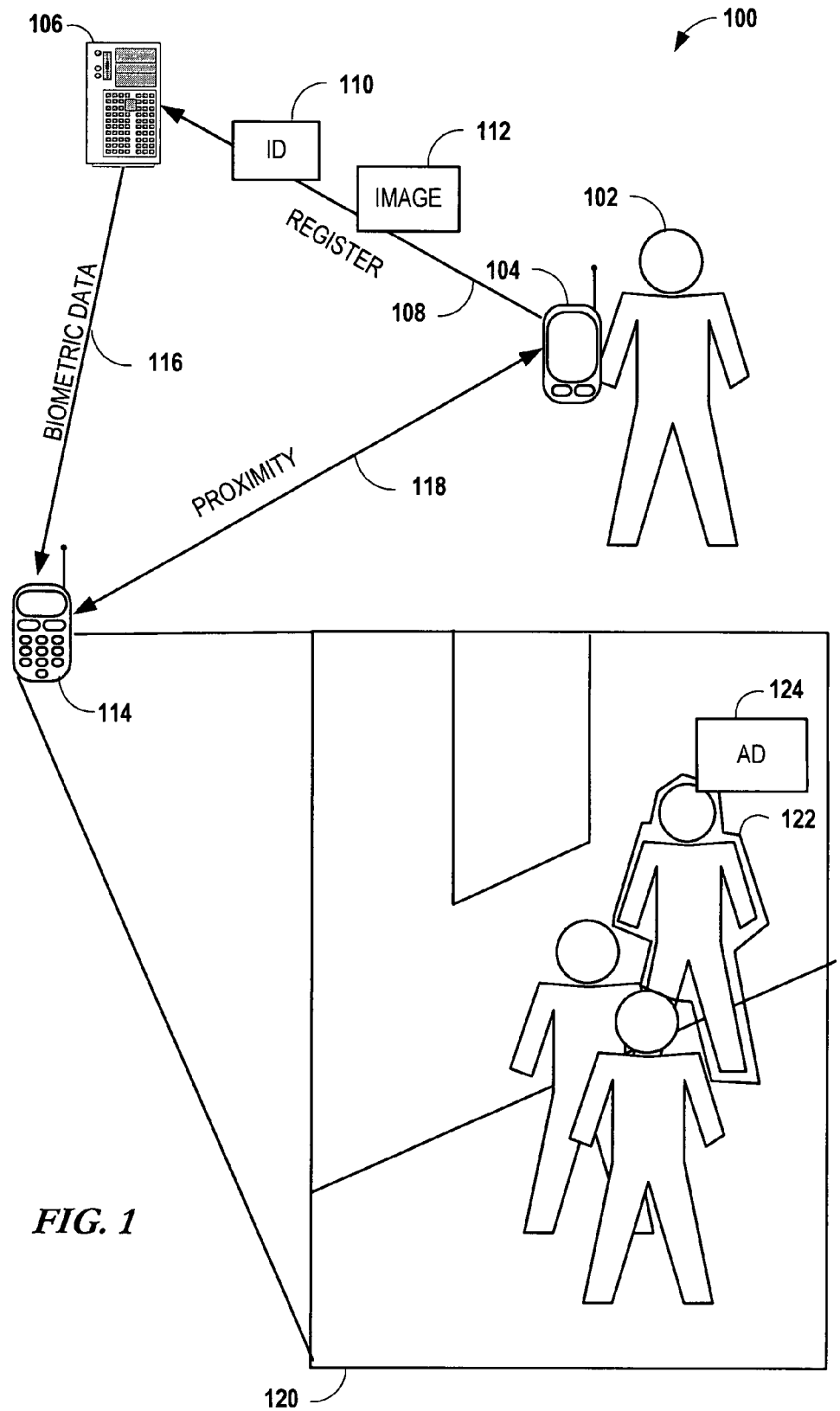
FIG. 1 is a block diagram illustrating a system according to embodiments of the invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present disclosure is directed to mobile advertising services and solutions. The technical framework of the invention may include technologies such as augmented reality, device proximity detection/identification, image recognition, face/identity recognition, and positioning technologies. In particular, various embodiments of the invention allow users to exploit their personal space by displaying advertisements in that space as viewed through augmented reality. As the term will generally be used herein, "augmented reality" involves the combination of virtual elements (e.g., computer generated graphics) with elements generated from real world measurements, such as video and still images. Augmented reality may be implemented in a mobile/portable computing device such as mobile phone, personal digital assistant (PDA), etc. The mobile device may include built-in cameras to capture images, and include a display to reproduce and augment those images.

The present invention may also utilize positioning and location technologies such as Cell ID, Bluetooth, Wibree, WLAN, and GPS. In some embodiments, a location/positioning technology may be used to determine the distance between two users, generally with a precision of a few meters. Other technologies such as RFID tags may by utilized to detect a user with a precision of a few centimeters. As will be described in greater detail hereinbelow, the use of location and positioning technologies triggers a system to perform further processing of imagery and other collected data.

Another technology that may be utilized by embodiments of the invention involves using biometrics to automatically recognize individuals. An example of these types of biometrics includes face recognition, which involves identifying a person from a digital photograph or video. Other identification techniques may be used with or instead of face recognition methods. For example, computer implemented methods are being developed to automatically identify people using monocular low-resolution video by analyzing various motion features, such as the height and stride parameters of a person's gait. Stride parameters (stride length and cadence) are functions of body height, weight, and gender, and may help to uniquely identify a certain person.

Generally, a user of a mobile multimedia device according to embodiments of the invention may be able to possess a virtual individual advertisement space. The user can then hire that space for displaying advertisements. The advertisements are viewed by another person through an augmented reality apparatus, such as the viewfinder display of a mobile multimedia device equipped with a video camera. The use of these techniques can provide benefits for the persons using the virtual individual advertisement space, for those viewing the advertising space, and for those wishing for unique ways in which to advertise.

Users who want to observe the promotional spaces of other users will generally use mobile devices equipped with a camera (or other sensor), a display (or other rendering device) that functions as a viewfinder, and a special client application for use with the system. The system may also require a continuous or partial network connection. When the user activates the viewer application, it contacts the server and requests information of registered users who are in the same location. This locational information can be obtained, for example, through Cell ID and GPS positioning. In addition, the viewer application may be able to perform a proximity scan, looking for BT, Wibree, and WLAN device IDs of users registered to promotional service. The viewer application determines which person the user is viewing through the viewfinder by comparing the person's facial features, hair color, and other biometric characteristics to the features stored in the database. The comparison is preferably limited to users whose devices have been detected to be in close proximity. This recognition may be augmented with the use of additional technologies (such as RFID tags) to get better matches of persons who are being viewed through the viewfinder. If the detection methods are robust enough, and they may be able detect even a user who has his back turned to the camera, such as by gait detection, RFID detection, etc.

The advertisements provided in the viewer may be still images, animations, or video clips. The advertisements may also contain audio, which is reproduced on the viewing device. Text may be added to the advertisements. The advertisements may disappear automatically after a while or after the user viewing them has dismissed them (e.g., by clicking a button or on a touch screen). There may be further action, such as opening an internet browser and displaying a web page promoting the product, when the user has dismissed the promotional advertisement. In order to promote use of the system, there may be competitions to find contributors (e.g., those who have attached an advertisement to their virtual persona). For example, a viewer may win a prize after discovering and clicking on some number of discovered advertisements from different people. Similarly, those who are discovered may receive something of value when others view them using this type of system.

Such a promotional system may allow for many variations. For example, an altered visualization of a participant may also be accompanied by other media (e.g., music files, photos) that the participant is currently consuming or has recently consumed with his mobile device. For instance, the picture of a musical single or album could be shown. By clicking on the visualization, the viewer could download the media file in question from the mobile device through some superdistribution-type compensation scheme. In another variation, the information on the advertisement may be stored on the viewing/recording device when a video clip is taken of the participant who is carrying the promotional advertisement. Thus, the advertisements would appear when the video is reproduced without the need for the ad-sponsoring individual to be present. The information on the advertisement to be displayed can be stored in a metadata section of the video file.

In another variation, the viewing person may have control over what advertisements are shown. For example, if there are several people in the camera view, the view may become crowded if several advertisements are shown on the screen. The viewer may thus wish to control which advertisements to look at. For example, if the viewer moves the joystick left, the advertisements on the left are shown and the advertisements of the persons on the right may be removed. Moreover, the system might provide a "zoom" function so that the user could control whether the advertisements associated with the people in the foreground or background are visible. For example, if the user moves the joystick upwards the advertisements of the persons farther away from the viewer could be shown, whereas if the user moves the joystick downwards the advertisements of the persons on the foreground could be shown. Other filters may also be set by viewers, participants, and/or service providers. Such filters may limit who or what is shown in viewing devices based on the advertising (e.g., ad type, offers associated with viewing the ad, media in which the ad is presented), the person sponsoring and/or viewing the advertising (e.g., age, gender, affiliation with a particular group or organization), and other factors (e.g., provider networks, device type).

A promotion system provides novel and exciting mobile advertisement opportunities. The user who agrees to promote a product in his or her promotional space can get something of value in return for participating (e.g., a discount from the advertiser) as well as additional rewards each time the participant is actually viewed. For example, mobile operators could give some free air time to users who commit to promote the operator. In another scenario, a fashion model could have an arrangement with a clothes manufacturer where the model would be provided with free clothes and the manufacturer's logo would always appear in the view around the model when seen through supported devices.

Various promotional campaigns, e.g., competitions, can be organized on the basis of the embodiments described herein. For example, by viewing and clicking the advertisements, users could get discounts to the promoted product. Advertising campaigns using sponsored personas could be limited to a particular time and place to concentrate use of the services and further promote the event occurring at that time and place. For example, a music festival could entice a number of concertgoers to sponsor various bands or products, and encourage others to discover those sponsors by offering music downloads or other rewards for any discoveries made. These are just a few examples facilitating personal promotion of products and providing motivation for others to view such advertisements along with the people promoting them.

In reference now to FIG. 1, a system 100 according to an embodiment of the invention is illustrated. The system involves at least one individual 102 who wishes to host advertising. The participant 102 may register 108 with a service entity 106, and associate the registration 108 with a mobile device 104 of the participant 102. Typically the participant 102 registers 108 using the mobile device 104, although this is not strictly necessary. As will be described in greater detail further on, the service entity 106 may use an identifier 110 of the device 104 that is submitted with the registration 108. This identifier may be may be provided by the device 104 itself during registration, or by some other means (e.g., manual form entry on a web page). The user 102 may wish to register 108 multiple devices with the service, and the system may facilitate such a submission from a single device 104. The device ID 110 may include hardware identifiers (e.g., Bluetooth, Wibree & WLAN) and/or addressing data (e.g., phone number URL, Cell ID).

In addition to providing a device identifier 10, the participant 102 may also provide an image 112 with the registration 108. The image 112 is typically a digital photograph or video. For example, the image 112 may include one or more high-resolution portraits of the participant 102, taken from different angles and in different light conditions to make the face matching and hair color recognition more robust. The image 112 may include full body images or even short video clips of the participant 102 walking to allow different identification methods to be used. The image 112 may also contain metadata that allows any combination of human recognition algorithms to better recognize the participant based on any combination of sensory measurements made via a target viewer device 114.

After registration 108, the service entity 106 may analyze and store a set of facial features from the images 112 provided by the user. If the image 112 includes video (e.g., of participant 102 walking), features describing the gait may be analyzed and stored via the service entity 106. Any other biometric related data can generated by the service entity 106, submitting device 104, or other device, and stored via the service entity 106 for later use. This later use may include sending out biometric data 116 via a network to the viewer device 114. The biometric data 116 enables the viewer device 114 to identify the participant 102 using sensors accessible via the viewer device 114. In other implementations, the participant 102 may be able to generate and submit biometric data directly to the service 106 as part of registration 108, thereby forgoing the need to have the service entity 106 manage images and generate the biometric data 116 that is eventually sent out to viewer devices 114.

It will be appreciated that the viewer device 114 may not have the capability to store large amounts of metadata 116. Therefore, the sending of metadata 116 may occur in response to proximity detection 118 between the participant's mobile device 104 and the viewer device 114. As illustrated, the proximity detection 118 may occur between the devices 104, 114, such as by detection of Bluetooth identifiers, RFID detection, and other proximity detection technologies. In other arrangements, the proximity detection 118 may be provided via the service entity 106. For example, the service 106 may detect location data of the devices 104, 114, such as cell ID and the GPS location updates, and thereby determine that the devices 104, 114 are in proximity. This proximity signal may be provided, either directly or indirectly, by the sending of the metadata 116 relating to the particular device 104, or the service 106 may use a separate proximity signaling channel (not shown).

The viewer device 114 uses the received metadata 116 to detect the presence of the participant using a sensor of the device 114, such as a charge-coupled detector (CCD) capable of digitally capturing still and moving images. Such a sensor may be incorporated directly into the viewer device 114, or accessible via the device (e.g., an external webcam that can stream video directly to device 114 via a local wireless connection). If the device 114 detects the participant 102 in the sensor images, the viewer device 114 may alter an image displayed to the device's user, as represented by screen 120. In this example, the participant 102 has been detected by the device 114, and a highlighting effect 122 has been applied over the portion of the image 120 where the participant 102 was detected. Further, an ad 124 may also be superimposed on the image 120, typically proximate to the portion of the image 120 that shows the participant 102.

By registering 108 with the service entity 106, the participant indicates a willingness to have his or her detected image highlighted 122 and displayed with an ad 124. The participant 102 may choose which ads are displayed with his or her images, or such selections may be made by the service entity 106. In some cases, the participant 102 will agree to such an arrangement in return for something of value, e.g., money, goods, services, like-kind referrals, etc. The system 100 may also provide some reward to the user of the target device 114 in order to persuade the user to actually view the screen 120, and thereby view the ad 124.

Figure 2:
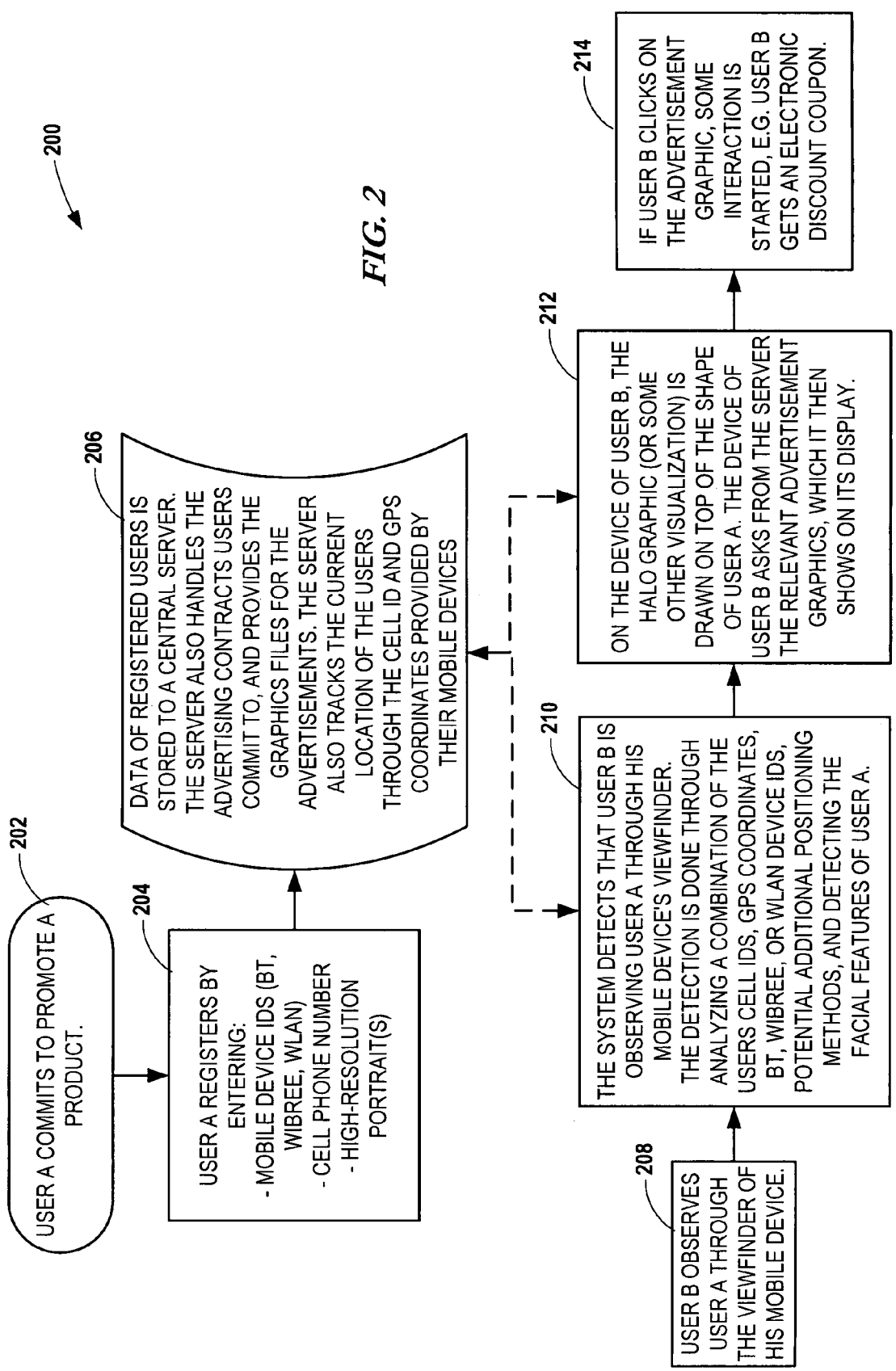
FIG. 2 is a flowchart diagram illustrating a process according to an embodiment of the invention.

An example procedure according to an embodiment of the invention is shown in the flowchart 200 of FIG. 2. In this scenario, User A has committed 202 to promote a product, and so User A registers 204 with an ad promotion service using a mobile device ID, cell phone number. Data of registered users, including User A, is stored 206 to a central server. The server may also handle the selection and placement of ads with the images of the users. User B observes 208 User A through the viewfinder (or display) of a mobile device, and the system detects 210 this observation. In response to the detection 210, an ad graphic is drawn 212 on top of the images in User B's display. If User B clicks 214 (or otherwise selects) the ad graphic, interaction is started. For example, User B may obtain an electronic coupon as a reward for finding and viewing the ad.

Figure 3:
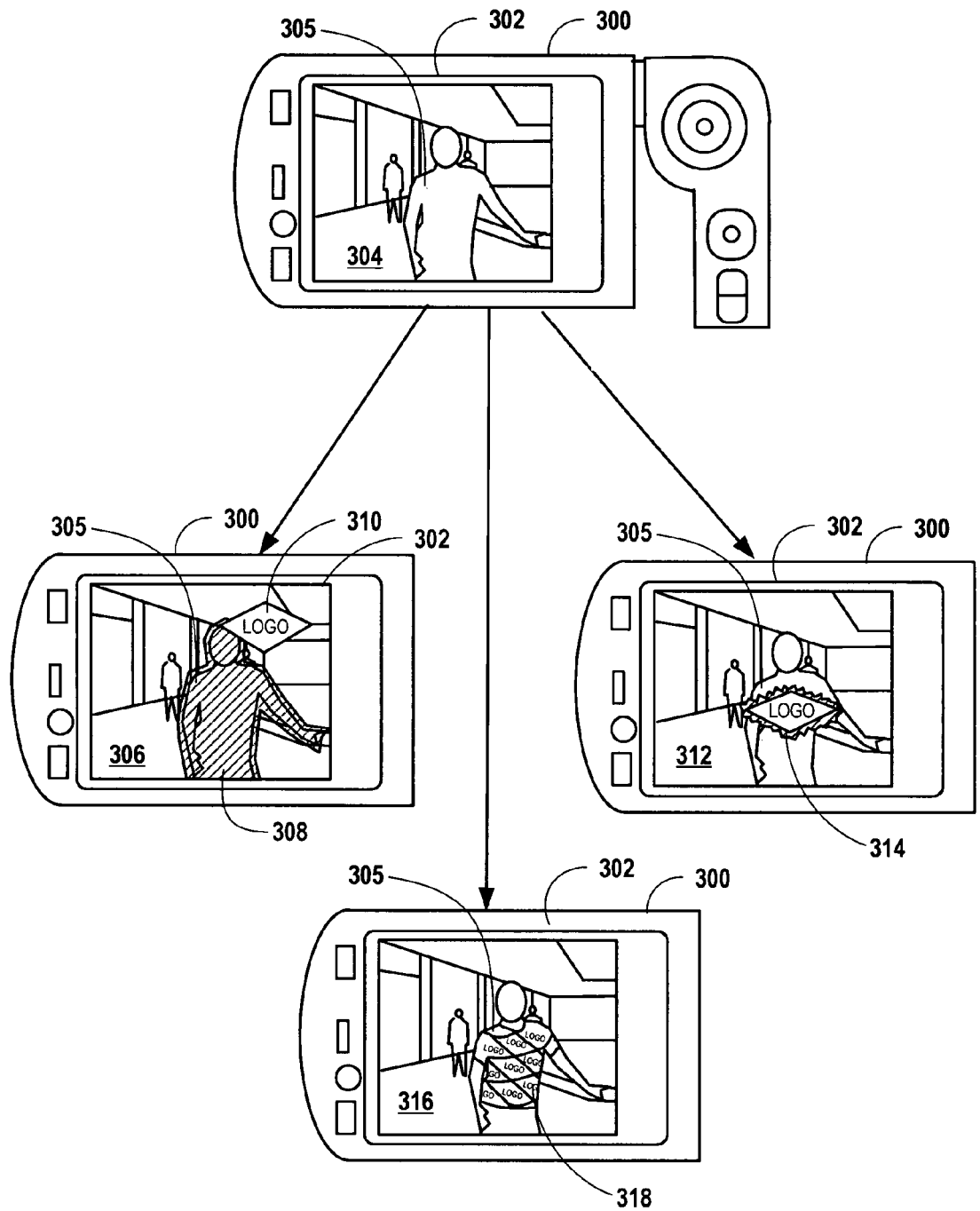
FIG. 3 is a diagram illustrating various graphical overlays according to embodiments of the invention.

In reference now to FIG. 3, diagrams illustrate example placement of ads on a display 302 of a mobile device 300 according to embodiments of the invention. Generally, a user of the device 300 is viewing live images taken by a camera (not shown) used by device 300. The unaltered view of the display 302 is seen in screen image 304, which shows at least one person 305 in the scene currently being captured by device 300. Based on a proximity triggering, the device 300 may process the image 304 in order to find a match to a particular biometric pattern. The biometric pattern of interest is typically sent to the device 300 after the proximity triggering, however other arrangements may also be used. For example, the device 300 and another device could use peer-to-peer proximity triggering, and the biometric patterns of the individual of interest could be sent from that individual's proximate device to viewing device 300. In another example, images of the participant may be sent directly to the device 300, either from a service or directly from a peer, and the device 300 performs its own biometric analysis of those images.

The device 300 scans the image 304 for patterns matching the biometric patterns, and assuming the image of person 305 matches those patterns, the display 302 may alter the image 304 in a number of ways. For example, altered image 306 shows a translucent overlay 308, or "halo," superimposed over the image of the person 305. The "halo" 308 can be realized by detecting, with the viewing application, the shape of the person 305 and drawing a semitransparent, colored graphic around the shape. An advertisement icon 310 (which may be any combination of text, bitmap, vector graphic, animation, etc.) appears next to the person 305 in the halo 308, and the icon 310 may have the same color as the halo 308. The halo graphic 308 helps to visualize which person 305 (e.g., in cases where several persons appear in the viewfinder) is the promoter.

The advertising icon 310 and/or overlay 308 may be selectable to trigger other actions, such as to receive an electronic coupon from the other person's device or from the ad service, to display ad content, to download content from the other person's device or content (e.g., music file), etc. The overlay 308 may also be selectable for the same or different purposes than the icon 310. For example, the person 305 may wish to advertise their own personal data with their overlay image 308, such as age, hobbies, etc. In any of the examples presented herein, additional graphics presented in response to image detection may be selectable for any combination of these and other uses.

Another example of how the image may be altered is shown in altered image 312. In this example, a graphical logo 314 is superimposed over the image of the person 305, and the logo 314 itself may have a "halo" (e.g., glowing outline) that indicates it has been added to the image and/or may be selected. In altered screen 316, a 3-D surface map 318 has been overlaid over the image of the person 305, and the surface map 318 may contain ad materials (e.g., logos, text). The surface may 318 may have other features that allow the viewer to easily distinguish it from the unaltered image 304, such as rollover effects, luminescence, animation, etc.

Figure 4:
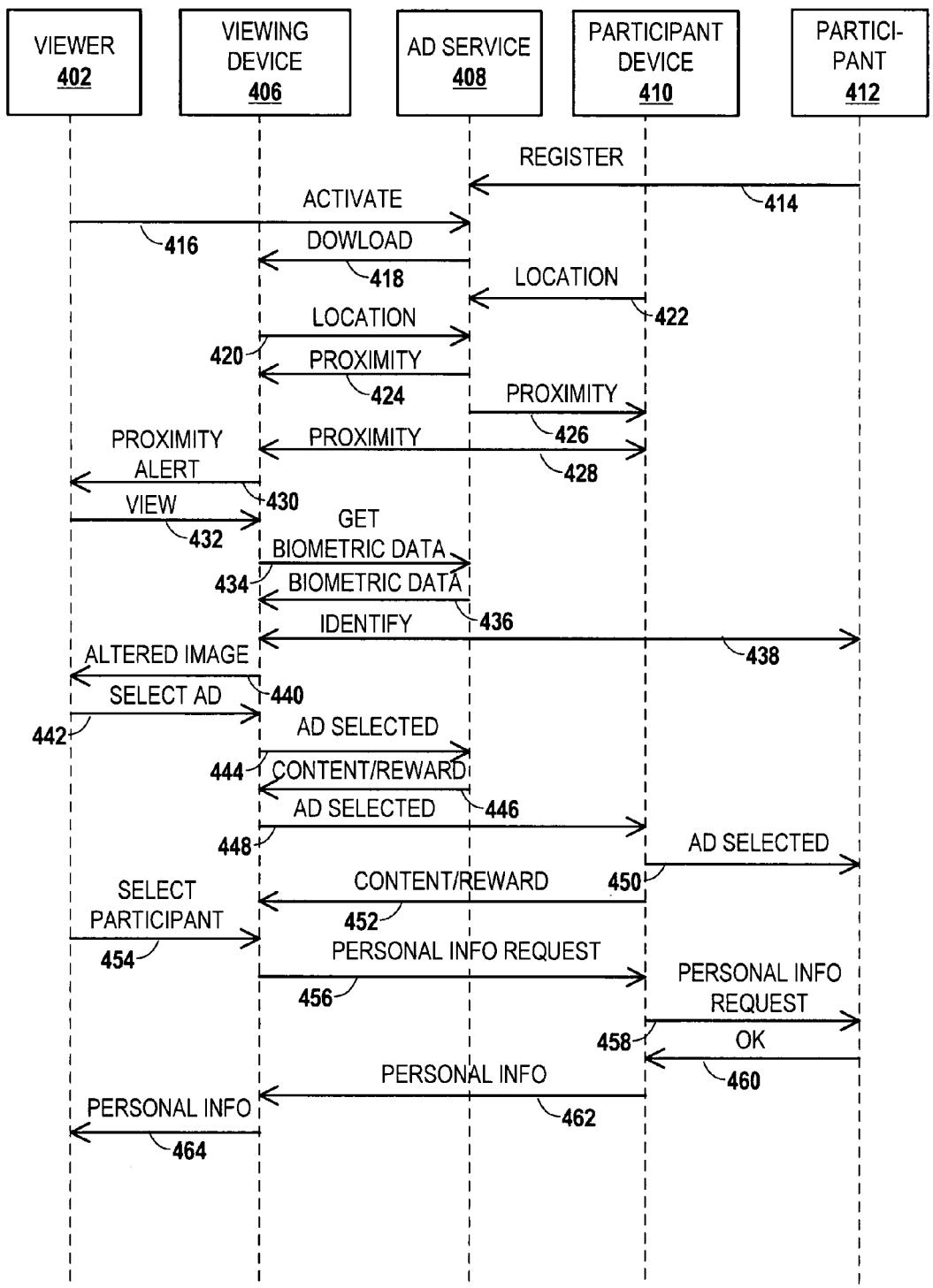
FIG. 4 is a sequence diagram illustrating system communications according to an embodiment of the invention.

In reference now to FIG. 4, a sequence diagram illustrates user and device interactions in a system according to embodiments of the invention. The scenario in FIG. 4 involves at least one person 402 who with a viewing capable device 406. Another person 412 acts as a participant (e.g., associates ad with their personal identity) and typically carries a device 410 that allows the participant's presence to be detected. An ad service entity 408 may generally interact with both user devices 406, 410 for facilitating certain system functions, although those skilled in the art will recognize that functions associated with the ad service 408 may also be implemented directly between devices 406, 410 in a peer-to-peer fashion.

The participant 412 may be required to register 414 with the service 408 in order to enable others to view their sponsored ad or ads. This registration 414 may be made via device 410 or via some other device, and generally includes data such as identifiers associated with device 410, imagery, and/or biometric data/metadata that allows the participant to be recognized by viewing device 406. In a peer-to-peer implementation, this registration 414 may be internal, such that the device 410 determines the biometric data/metadata and authorizes its direct transmission from the device 410 to peers. Similarly, the viewer 402 may need to signal willingness to participate, such as by activation 416 with the service 408 which may occur via device 406 or some other entity. Such activation 416 may involve the downloading 418 of special software to the viewing device 406. In a peer-to-peer implementation, the activation 416 may occur internal to the device 406, and the download 418 may be obtained from any source, including a peer device such as participant device 410.

In some implementations, the service 408 may require or allow the devices 406, 410 to transmit location data 420, 422, respectively to the service 408. Based on this data 420, 422, the service 408 may signal 424, 426 to one or both of devices 406, 410 that one is in proximity to another. Although the signaling 426 to the participant device 410 may not be required for system operation, the participant 412 may still desire this signal 426 be sent to the participant's device 410, for purposes such as logging of the event and/or receiving alerts that they have been detected. The participant 412 may desire such signaling 426 out of personal interest, or to track for themselves who is viewing them and how often.

The devices 406, 410 may also be able to detect and signal 428 their proximity to each other, and the signaling 428 may occur in either direction. Generally, at least viewing device 406 will become aware of the proximity to device 410, and therefore be aware of proximity to participant 412. The viewing device 406 may signal 430 to the viewer 402 that at least one participant device 410 is in proximity. This signal 430 may be in the form of a special ringtone, text message, email, or other indicator that alerts the viewer 402 to that at least one participant 412 is proximate. In response to the alert 430, the viewer 402 can take some action, such as taking out the device 406, starting an application, and viewing 432 through a viewfinder of the device 406.

In order for the device 406 to identify the participant 412, the device 406 may need imagery and/or biometric data/metadata, seen here as provided by a request 434 and response 436 with the ad service 408. Downloading metadata 436 after a viewing request 432 is signaled will preserve network bandwidth because no data is requested 434 or downloaded 436 without a specific request 432 indicating that the data will be used. However, this sequence may cause some lag due to the time needed to download 436 the biometric data after the viewer's indication 432 that they want to find the participant. If quicker system performance is desired, the data download 436 may occur contemporaneously with the signaling 424, 428 of proximity. Also, in a peer-to-peer arrangement, the request 434 and/or response 436 may occur instead between the peer devices 406, 410.

After the viewing device 406 has obtained data 436, it may then scan with its sensors (e.g., CCD) to identify 438 the participant 412 based on the biometric data 436. Based on the identification 438, the viewing device 406 may alter 440 an image displayed to the viewer 402 so that the viewer 402 can identify the participant 412 in the image as well as a graphic and/or text that represents ad materials sponsored by the participant 412. Such an ad graphic/text may be selected 442 by the viewer 402, and in response a signal 444 is sent to the service 408. In response to the selection signal 444, the service 408 may send content/reward 446 to the viewer's device 406, such as electronic documents, electronic media, messages, electronic coupons, etc. The content/reward 446 may be communicated to the participant 402 in other ways not connected to the viewing device 406, such as by sending content/reward to the participant 402 via postal mail.

The selection 442 may also be communicated 448 directly to the participant's device 410, which then signals 450 this to the participant 412. These signals 448, 450 may be in addition to the service signaling 444, or be made in the alternative, such as in a peer-to-peer arrangement. The participant 412 may also provide content and/or reward 452 to the viewer 402, such as via devices 410, 406, or other ways. For example, the participant 412 may carry physical samples and can provide them to the viewer 402 if approached. The content/reward 452 may be provided automatically or based on explicit approval of the participant 412. For example, the use of the viewing device 406 in this way may be part of an advertising sponsored game, and when "tagged" by being identified 438, the participant 412 passes some unique data object to the viewing device 406 (e.g., virtual trading card).

As previously described, the altered image 440 presented to the viewer 402 may also highlight the identity of the participant 412 in that image 440, and the highlighting (or other effect) may be selectable 454 for other purposes. For example, the advertising provided by the service 408 and/or participant device 410 may also be a way to meet people with common interests. For example, if the advertising were for a particular musical group, then people having similar musical interests may want to meet. In other situations, the participant 412 may be a sole proprietor or a franchisee, and this is one form of advertising for that business. In that case, the participant 412 is also the business/franchise, and may wish to meet other people directly to discuss business. In such a case, the selection 454 for further information may be communicated 456, 458 to the participant 412 via devices 406, 410 (service 408 may also be involved). If the participant 412 signals 460 acceptance of the request, the personal data may be communicated 462, 464 to the viewer 402. Such personal data may include participant's name, email address, personal web page, hobbies, interests, etc.

Figure 5:
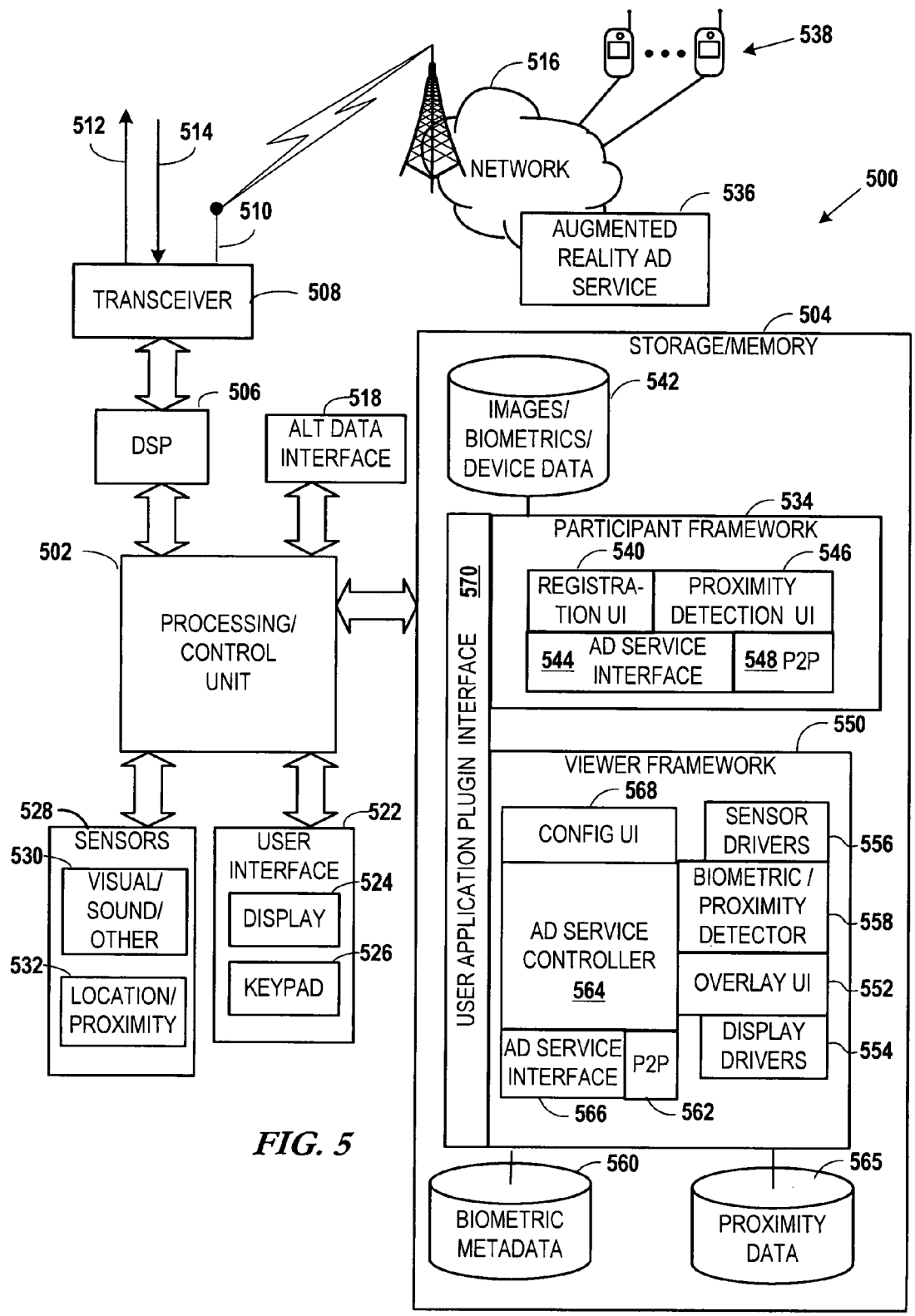
FIG. 5 is block diagram of a mobile computing arrangement according to an embodiment of the invention.

Many types of apparatuses may be able participate in both viewing and sponsoring ad materials discovery as described herein. Mobile devices are particularly useful in this role. In reference now to FIG. 5, an example is illustrated of a representative mobile computing arrangement 500 capable of carrying out operations in accordance with embodiments of the invention. Those skilled in the art will appreciate that the exemplary mobile computing arrangement 500 is merely representative of general functions that may be associated with such mobile devices, and also that landline computing systems similarly include computing circuitry to perform such operations.

The processing unit 502 controls the basic functions of the arrangement 500. Those functions associated may be included as instructions stored in a program storage/memory 504. In one embodiment of the invention, the program modules associated with the storage/memory 504 are stored in non-volatile electrically-erasable, programmable read-only memory (EEPROM), flash read-only memory (ROM), hard-drive, etc. so that the information is not lost upon power down of the mobile terminal. The relevant software for carrying out conventional mobile terminal operations and operations in accordance with the present invention may also be transmitted to the mobile computing arrangement 500 via data signals, such as being downloaded electronically via one or more networks, such as the Internet and an intermediate wireless network(s).

The mobile computing arrangement 500 includes hardware and software components coupled to the processing/control unit 502 for performing network data exchanges. The mobile computing arrangement 500 may include multiple network interfaces for maintaining any combination of wired or wireless data connections. In particular, the illustrated mobile computing arrangement 500 includes wireless data transmission circuitry for performing network data exchanges.

This wireless circuitry includes a digital signal processor (DSP) 506 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 508, generally coupled to an antenna 510, transmits the outgoing radio signals 512 and receives the incoming radio signals 514 associated with the wireless device.

The incoming and outgoing radio signals 512, 514 are used to communicate with a mobile service provider network 516. The network 516 may include any voice and data communications infrastructure known in the art, including CDMA, W-CDMA, GSM, EDGE, etc. The network 516 typically provides access to traditional landline data infrastructures, including IP networks such as the Internet. The mobile computing arrangement 500 may also include an alternate network/data interface 518 capable of accessing the network 516 and/or a proximity network (not shown). The alternate data interface 518 may incorporate combinations of I/O and network standards such as USB, Bluetooth, Ethernet, 802.11 Wi-Fi, IRDA, etc.

The processor 502 is also coupled to user-interface elements 522 associated with the mobile terminal. The user-interface 522 of the mobile terminal may include, for example, a display 524 such as a liquid crystal display. Other user-interface mechanisms may be included in the interface 522, such as keypads 526, speakers, microphones, voice commands, switches, touch pad/screen, graphical user interface using a pointing device, trackball, joystick, etc. One or more sensors 528 may also be coupled to the processor 502. The sensors 528 may include sensor(s) 530 capable of capturing video, sound, and other natural phenomena. A location sensor 532 may capture one or both of location and proximity for purposes such as directly or indirectly detecting a proximate mobile device. These and other external interface components are coupled to the processor 502 as is known in the art.

The program storage/memory 504 typically includes operating systems and programs for carrying out functions and applications associated with functions on the mobile computing arrangement 500. The program storage 504 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 504 of the mobile computing arrangement 500 may also include software modules for performing functions according to embodiments of the present invention.

In particular, the program storage/memory 504 may include a participant framework 534 that allows the user to register with an augmented reality advertising service 536 via network 516, and enable the user's likeness to be detected and displayed with ads in peer devices 538. The participant framework 534 may include a registration user interface (UI) 540 that allows the user of the arrangement 500 to submit registration data 542 to the service 536. The registration data 542 may include still and video images of the user, precompiled biometric data and data, device information, user information, etc. The registration interface 540 may utilize an ad services network interface 544 for submitting this data 542 to the service 536, as well as other data such as ad categories, terms and conditions, location/time filters for availability, etc.

The participant framework 534 may also contain a proximity detection UI 546 for determining when a peer device 538 has detected the mobile device 500 in proximity and alerting the user. This detection may be an option of interest to the user, or may be part of a peer-to-peer (P2P) communication between devices, as represented by P2P interface module 548. In a P2P configuration, the proximity detection UI 546 may detect the presence of a peer 538, make further queries of the peer 538 as to whether any further communications should commence, and facilitate user-authorized transfer of some data 542 that allows the peer 538 to detect a user of the device and view user-sponsored ads based on the data 542.

Besides enabling a participant role, the mobile arrangement 500 may also facilitate the user viewing personal-sponsored ads of others, as represented by the viewer framework 550. This framework 550 provides a UI 552 that overlays graphics on images of individuals who are detected by way of sensors 530 and provided to the UI 552 by way of sensor drivers 556. The graphics may include ad data and may be overlaid on live recorded data (e.g., video) via display drivers 554. The ad-sponsoring individual may be detected using a biometric/proximity detector 558 that utilizes biometric data 560 to analyze incoming imagery from the sensor drivers 556. The biometric data 560 may be collected locally, such as being downloaded from proximate peers 538 via P2P interface 562. The biometric data 560 may also be obtained from the network service 536 by way of an ad service interface controller 564 and ad service network interface 566. In some configurations, the biometric data 560 may be cached for a limited amount of time, e.g., for as long as devices/users are detected in the area that are associated with the data.

The biometric/proximity detector 558 may detect proximate devices directly, via sensor drivers 556 and sensors 532, or indirectly via the ad service controller 564 which receives proximity indications from the network service 536. Generally, the detection of proximity devices by the detector 558 may trigger the downloading of biometric data for use in analyzing sensor data and adding overlays via the overlay UI 552. The proximity data 566 may be cached in a database 565, either temporarily or for a long timeframe. An example of long-term storage of proximity data 565 may include the storage of a database of trusted devices, e.g., provided by the ad service 536. The participant framework 534 may also have use of this kind of database 565, such as to identify trusted users and to identify frequent viewers of the device owners image/ads.

The viewer framework 550 also contains a configuration UI 568 that provide the user options to tailor the viewing behavior for performance, relevance, security, and other operational aspects. For example, the UI 568 may allow the user to limit proximity detection and graphic overlays based on factors such as ad classifications, user groups, network transports, proximity detection methods, time, place, etc.

The participant and viewer frameworks 534, 550 may be implemented as full independent applications, and/or may provide functionality that extends other applications. This is represented by user application plug-in interface 570. This interface 570 may provide hooks that allow other applications to use the functionality of the frameworks 534, 550. For example, a browser application may use the interface 570 to embed the viewer UI 552 in a frame that also displays information not provided by the ad service 536. Similarly, the application plug-in interface 570 may allow the frameworks 534, 550 to utilize the functionality of other applications. For example, the participant framework 534 may be able to derive some of the registration data 542 from user profiles, image libraries, and other data stored on the device. Both frameworks 534, 550 may be able to utilize system utilities via the interface 570, such as virus scanners, authentication, contact databases, etc.

Figure 6:
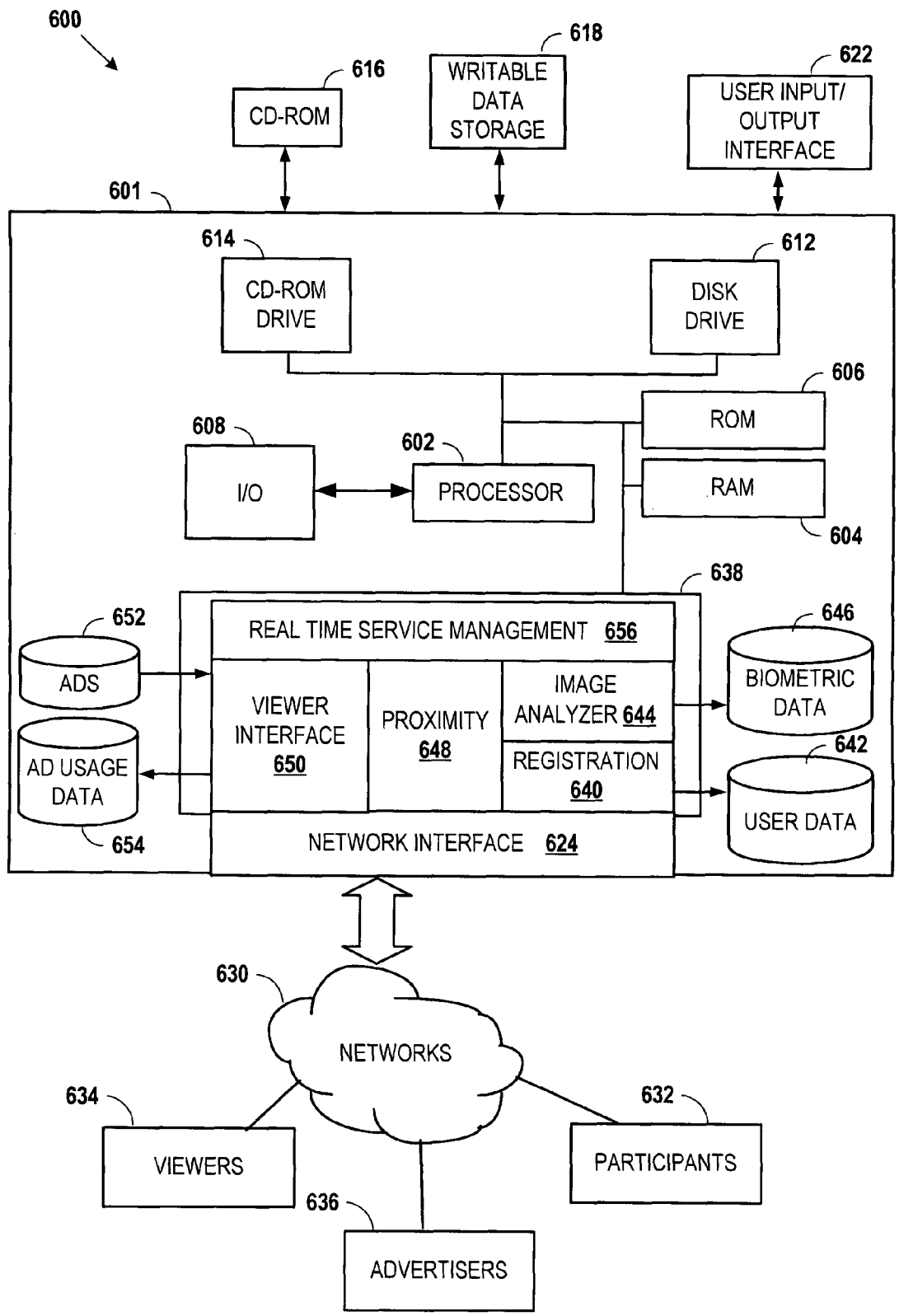
FIG. 6 is block diagram of an augmented reality service arrangement according to an embodiment of the invention.

A content discovery system as described herein can be implemented using one or more network servers to gather, coordinate, and distribute, biometric data and ad data as described herein. In reference now to FIG. 6, a block diagram illustrates an example augmented reality ad service 600 according to an embodiment of the invention. The service 600 includes a computing arrangement 601. The computing arrangement 601 may include custom or general-purpose electronic components. The computing arrangement 601 includes a central processor (CPU) 602 that may be coupled to random access memory (RAM) 604 and/or read-only memory (ROM) 606. The ROM 606 may include various types of storage media, such as programmable ROM (PROM), erasable PROM (EPROM), etc. The processor 602 may communicate with other internal and external components through input/output (I/O) circuitry 608. The processor 602 carries out a variety of functions as is known in the art, as dictated by software and/or firmware instructions.

The computing arrangement 601 may include one or more data storage devices, including disk drives 612, CD-ROM drives 614, and other hardware capable of reading and/or storing information such as DVD, etc. In one embodiment, software for carrying out the operations in accordance with the present invention may be stored and distributed on a CD-ROM 616, writable data storage media 618 or other form of media capable of portably storing information, including magnetic media, flash memory, etc. These storage media may be inserted into, and read by, devices such as the CD-ROM drive 614, the disk drive 612, I/O ports 608, etc. The software may also be transmitted to computing arrangement 601 via data signals, such as being downloaded electronically via a network, such as the Internet 630. The computing arrangement 601 may be coupled to a user input/output interface 622 for user interaction. The user input/output interface 622 may include apparatus such as a mouse, keyboard, microphone, touch pad, touch screen, voice-recognition system, monitor, LED display, LCD display, etc.

The computing arrangement 601 may be coupled to other computing devices via networks. In particular, the computing arrangement includes a network interface 624 for communicating with networks 630. The network interface 624 may include a combination of hardware and software components, including media access circuitry, drivers, programs, and protocol modules. The networks 630 may include any combination of private or public networks such as the Internet. The networks 630 allow the computing arrangement 601 to communicate with entities such as participant devices 632, viewer devices 634, and advertiser devices 636 (e.g., devices of those entities who supply and pay for personally sponsored ads).

The computing arrangement 601 includes processor executable instructions 638 for carrying out management tasks of the computing arrangement 601. These instructions 638 may include a registration interface 640 receiving registration data from participant devices 632. The registration data may include images, device data, personal data, preference data, etc. The registration interface 640 may store most or all of the registration data into a user database 642. Other processing of the data, such as images, may be performed by an analyzer module 644. The analyzer module detects still or moving images, and extracts biometric data 646 that can be used by viewers devices 634 to recognize participating individuals.

The participant devices 632 and viewer devices 634 may also regularly communicate proximity and/or location data to a proximity data module 648 of the service 600. The proximity module 648 may track locations of viewer and participant devices 634, 632, and communicate to one or both when they are proximate to within a predetermined distance. The proximity module 648 may make use of filters set by both viewers and participants to prevent the signaling of proximity under certain user-defined conditions. Note that the proximity module 648 may use both location and proximity data to derive proximate devices. For example, the module 648 may determine based on GPS location data that terminal A is proximate to terminal B, and find out from an RFID detector in terminal B that terminal B is proximate to terminal C. Thus the module 648 may also conclude that terminal C is proximate to terminal A as well as to terminal B.

The service 600 includes a viewer interface 650 for interacting with viewer devices 634. These interactions include accepting viewer connections/logins, sending proximity alerts to viewers 634, sending biometric data and metadata 646 to viewers 634, sending ad materials 652 associated with the biometric data 646 to viewers 634, processing ad or participant image selections detected by viewer devices 634, and collecting ad usage data 654, e.g., for billing and reporting to advertisers 636. Any of the interface modules 640, 644, 648, 650 may process incoming and outgoing data in near real-time, and therefore a real-time service management module 656 may coordinate operations between the various modules. For example, if a participant 632 changes a preference by way of the registration module 640, the real-time service module 656 may apply those changes to ongoing data being sent to viewers 634 who may be proximate to the participant 632, and therefore may be affected by the changes.

Figure 7:
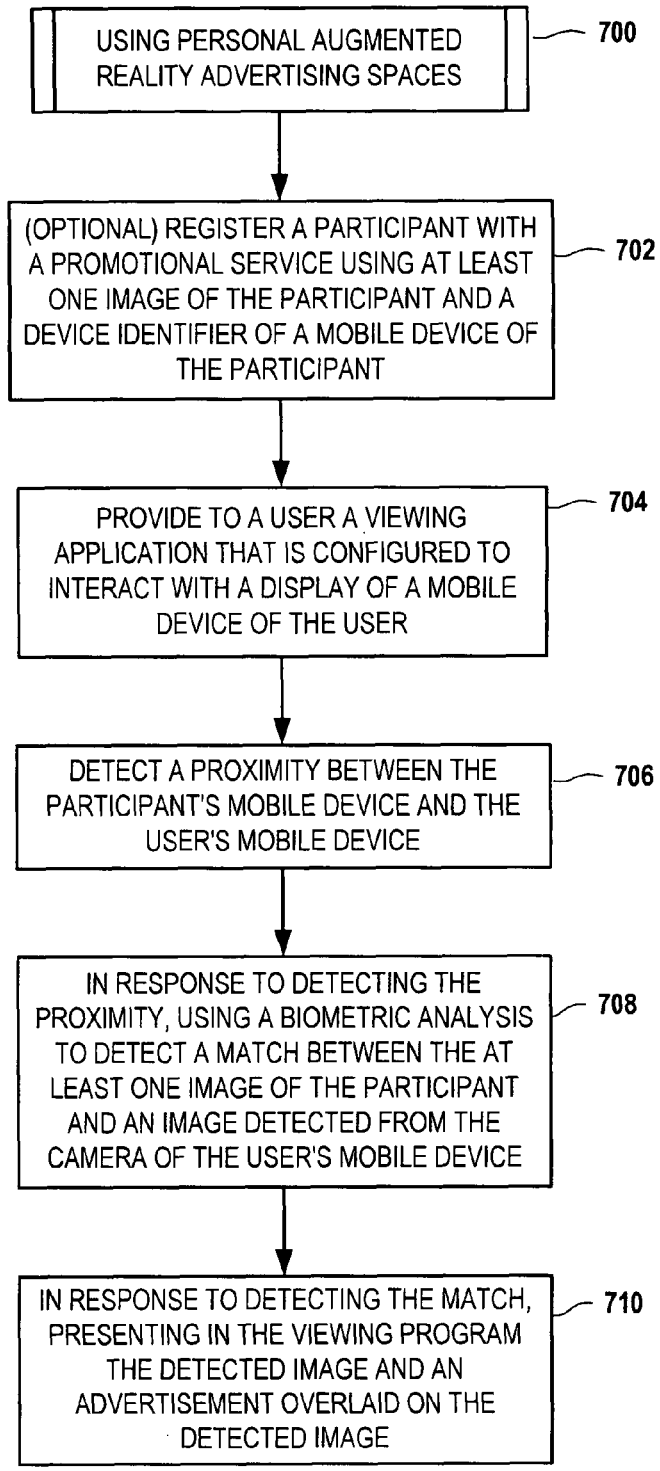
FIG. 7 is a flowchart showing a procedure according to an embodiment of the invention.

In reference now to FIG. 7, a flowchart illustrates a procedure 700 for using personal augmented reality advertising spaces according to an embodiment of the invention. The procedure 700 may optionally involve registering 702 a participant with a promotional service using at least one image of the participant and a device identifier of a mobile device of the participant. The registrations 702 may not be needed in situations where the devices and system is configured in a peer-to-peer arrangement. A viewing application is provided 704 to a user. The viewing application is configured to interact with a display of a mobile device of the user. A proximity between the participant's mobile device and the user's mobile device is detected 706 and, in response to detecting the proximity, a biometric analysis 708 is used to detect a match between at least one image of the participant and an image detected from the camera of the user's mobile device. In response to detecting the match, the detected image and an advertisement overlaid on the detected image is presented 710 in the viewing program.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:
   causing, at least in part, detection of a proximity between a participant's mobile device and a viewer's mobile device, wherein an identifier of the participant's mobile device and biometric data that describes the participant have been made publicly available, the participant is registered with a promotional service, and the promotional service is independent from the participant and the viewer;
   obtaining the biometric data in response to detecting the proximity between the participant's mobile device and the viewer's mobile device;
   causing, at least in part, determination, by the viewer's mobile device, of a match between the biometric data of the participant and an image captured by a sensor of the viewer's mobile device when in the proximity;
   in response to the determination of the match, causing, at least in part, alteration, by the viewer's mobile device, of the captured image by superimposing thereinto an advertisement that is associated with the participant by the promotional service; and
   causing, at least in part, presentation, at the viewer's mobile device, of the captured image superimposed with the advertisement.

2. A method of claim 1, further comprising:
   causing, at least in part, registration of the participant with the promotional service using at least one image of the participant and the identifier of the participant's mobile device;
   determining the biometric data from the at least one image via the promotional service;
   associating the advertisement with the biometric data; and
   causing, at least in part, transmission of the biometric data, the advertisement, or a combination thereof, from the promotional service to the viewer's mobile device in response to detecting the proximity.

3. A method of claim 1, further comprising signaling to the promotional service an indication that the advertisement was presented in the viewer's mobile device.

4. A method of claim 3, further comprising causing, at least in part, provision of valuable consideration to the participant in response to the signaling to the promotional service.

5. A method of claim 1, wherein the advertisement is shown in the viewer's mobile device as an advertising graphic proximate to a portion of the captured image where the participant is shown.

6. A method of claim 5, wherein the advertising graphic is displayed by overlaying a semitransparent layer over the portion of the captured image where the participant is shown.

7. A method of claim 1, further comprising providing a user selectable link in the captured image in conjunction with presenting the advertisement overlaid on the captured image.

8. A method of claim 7, further comprising facilitating the download of content from the participant's mobile device to the viewer's mobile device in response to selecting the link.

9. An apparatus comprising:
   at least one processor; and
   at least one memory including computer program code for one or more programs, the at least one memory and the computer program code configured to, with the at least one processor, cause the apparatus to perform at least the following,
   cause, at least in part, detection of a proximity between a viewer's mobile device and a participant's mobile device, wherein an identifier of the participant's mobile device and biometric data that describes the participant have been made publicly available, the participant is registered with a promotional service, and the promotional service is independent from the participant and the viewer;
   in response to detecting the proximity, acquire the biometric data;
   capture an image by using a sensor of the viewer's mobile device when in the proximity;
   cause, at least in part, determination, by the viewer's mobile device, of a match between the biometric data of the participant and the captured image;
   in response to the determination of the match, cause, at least in part, alteration, by the viewer's mobile device, of the captured image by superimposing thereinto an advertisement that is associated with the participant by the promotional service; and cause, at least in part, presentation, at the viewer's mobile device, of the captured image superimposed with the advertisement.

10. A method of claim 1, further comprising:

determining to scan the captured image for biometric data by performing facial recognition, motion feature analysis, or a combination thereof, on the captured image, wherein the match is made between the biometric data of the participant and the biometric data scanned from the captured image.

11. A method of claim 1, further comprising:

placing the advertisement that matches at least a part of a contour of an image of the participant located within the captured image.

12. A method of claim 1, further comprising:

causing, at least in part, performing a proximity scan for at least one neighboring mobile device;

receiving identification information from the at least one neighboring mobile device; and causing, at least in part, transmission, to the promotion service, of a request for at least one participant's mobile device among the at least one neighboring mobile device and for biometric data that describes the at least one participant.

13. A method of claim 1, further comprising:

detecting, by the viewer's mobile device, a contour of an image of the participant presented within the captured image; and drawing the advertisement as an advertising graphic within the contour.

14. An apparatus of claim 9, wherein the biometric data is acquired from the participant's mobile device or a server.

15. An apparatus of claim 14, wherein the proximity is detected via proximity data received from a proximity sensor of the viewer's mobile device, or via a network.

16. An apparatus of claim 15, wherein at least one of the biometric data and proximity data is received from the promotional service.

17. An apparatus of claim 9, wherein the advertisement is shown in the viewer's mobile device as an advertising graphic proximate to a portion of the captured image where the participant is shown.

18. An apparatus of claim 17, wherein the advertising graphic is displayed by overlaying a semitransparent layer over the portion of the captured image where the participant is shown.

19. A non-transitory computer-readable storage medium carrying one or more sequences of one or more instructions which, when executed by one or more processors, cause an apparatus to at least perform the following steps:

causing, at least in part, detection of a proximity between a viewer's mobile device and a participant's mobile device, wherein an identifier of the participant's mobile device and biometric data that describes the participant have been made publicly available, the participant is registered with a promotional service, and the promotional service is independent from the participant and the viewer;

in response to detecting the proximity, acquiring the biometric data;

causing, at least in part, determination, by the viewer's mobile device, of a match between the biometric data of the participant and an image captured by a sensor of the viewer's mobile device when in the proximity;

in response to the determination of the match, causing, at least in part, alteration, by the viewer's mobile device, of the captured image by superimposing thereinto an advertisement that is associated with the participant by the promotional service; and causing, at least in part, presentation, at the viewer's mobile device, of the captured image superimposed with the advertisement.

20. A system comprising:

a participant's mobile device configured to make biometric data that describes the participant and the participant's mobile device publicly available, wherein the participant is registered with a promotional service, and the promotional service is independent from the participant and the viewer;

a viewer's mobile device configured to:

detect a proximity between the participant's mobile device and the viewer's mobile device;

acquire the biometric data in response to detecting the proximity;

capture an image when in the proximity;

determine a match between the biometric data of the participant and the captured image;

in response to the determination of the match, alter the captured image by superimposing thereinto an advertisement that is associated with the participant by the promotional service; and present the captured image superimposed with the advertisement.

* * * * *